(12) United States Patent
Kasamatsu (10) Patent No.: US 6,628,692 B2
(45) Date of Patent: *Sep. 30, 2003

(54) SOLID-STATE LASER DEVICE AND SOLID-STATE LASER AMPLIFIER PROVIDED THEREWITH

(75) Inventor: Tadashi Kasamatsu, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,411

(22) Filed: Apr. 30, 1999

(65) Prior Publication Data

US 2002/0094006 A1 Jul. 18, 2002

(30) Foreign Application Priority Data

May 11, 1998 (JP) .............................. 10-127976

(51) Int. Cl.[7] .............................. H01S 3/091; H01S 5/00
(52) U.S. Cl. .............................. 372/70; 372/71; 372/75; 372/50
(58) Field of Search .............................. 372/36, 50, 75, 372/70–74

(56) References Cited

U.S. PATENT DOCUMENTS

| | | | | | |
|---|---|---|---|---|---|
| 3,931,592 | A | * | 1/1976 | Hughes | 372/20 |
| 4,001,719 | A | * | 1/1977 | Krupka | 372/49 |
| 4,847,851 | A | * | 7/1989 | Dixon | 372/75 |
| 4,904,036 | A | * | 2/1990 | Blonder | 385/14 |
| 4,910,738 | A | * | 3/1990 | Fujita | 372/18 |
| 5,265,113 | A | * | 11/1993 | Halldorsson | 372/36 |
| 5,761,234 | A | * | 6/1998 | Craig | 372/75 |
| 6,072,815 | A | * | 6/2000 | Peterson | 372/36 |
| 6,160,824 | A | * | 12/2000 | Meissner | 372/7 |

FOREIGN PATENT DOCUMENTS

| | | |
|---|---|---|
| DE | 4415269 A1 | 11/1994 |
| EP | 0723323 A2 | 7/1996 |
| JP | 62-141507 | 6/1987 |
| JP | 63-60578 | 3/1988 |
| JP | 1-251678 | 10/1989 |
| JP | 3-100527 | 4/1991 |
| JP | 4-265249 | 9/1992 |
| JP | 4-354393 | 12/1992 |
| JP | 5-297253 | 11/1993 |
| JP | 8-97492 | 4/1996 |
| JP | 11-298068 | 10/1999 |
| JP | 11-346028 | 12/1999 |

OTHER PUBLICATIONS

The Laser Guidebook, Jeff Hecht editor, McGraw–Hill Book company, Copyright 1986. p. 29.*
European Search Report dated Feb. 2, 2001.

(List continued on next page.)

Primary Examiner—Paul Ip
Assistant Examiner—James Menefee
(74) Attorney, Agent, or Firm—McGinn & Gibb, PLLC (57) ABSTRACT

A laser crystal is formed on a substrate in a solid-state laser device. The laser crystal oscillates laser beam from a second end face when an excitation beam is projected to a first end face. An excitation beam emission element emitting the excitation beam is provided for the solid-state laser device. A waveguide path is formed on the substrate. The excitation beam is transmitted through the waveguide path. The waveguide path has a first end portion on which the excitation beam emitted by the excitation beam emission element impinges and a second end portion which opposes the first end face of the laser crystal. The excitation beam is emitted from the second end portion.

27 Claims, 7 Drawing Sheets

OTHER PUBLICATIONS

Fulbert et al.; Passively–Q–Switched Monolithic Microchip Laser;and Zayhowski et al.; "Electro–Optically–Q–Switched Nd:YVO4 Microchip Lasers"; Cleo '95; dated May 24, 1995; pp. 176–177.

Kaneda et al.; "Continuous Wave 355–nm All Solid–State Laser;" and J.J. "Zayhowski ; Nonlinear Frequency Conversion With Passively Q–Switched Microchip Lasers"; Cleo '96; dated Jun. 5, 1996; pp. 236–237.

Yamaguchi et al.; "Efficient Nd:YAG Laser End Pumped By a High–Power Multistripe Laser–Diode Bar With Multiprism Array Coupling"; Applied Optics; dated Mar. 20, 1996; vol. 35, No. 9; pp. 1430–1435.

Du et al.; "Fiber–Coupling Technique With Micro Step–Mirrors for High–Power Diode Laser Bars"; OSA Tops vol. 10 Advanced Solid State Lasers, 1997; pp. 390–393.

Taira et al.; "Single–Mode Oscillation of Laser–Diode–Pumped Nd:Y VO4 Microchip Lasers"; Optics Letters; dated Dec. 15, 1991; vol. 16, No. 24; pp. 1955–1957.

Zayhowski et al; "Diode–Pumped Microchip Lasers Electro–Optically Q Switched at High Pulse Repetition Rates"; Optics Letters; dated Sep. 1, 1992; vol. 17, No. 17; pp. 1201–1203.

* cited by examiner

SOLID-STATE LASER DEVICE AND SOLID-STATE LASER AMPLIFIER PROVIDED THEREWITH

BACKGROUND OF THE INVENTION

1. Field of the Invention

The present invention relates to a solid-state laser device for use as a light emission device or a similar device and a solid-state laser amplifier provided therewith, and more particularly to a solid-state laser device of a reduced size and a solid-state laser amplifier provided therewith.

2. Description of the Related Art

A so-called semiconductor laser pumped solid-state laser device (LD pumped solid-state laser device) using a semiconductor laser (laser diode) as an excitation light source has such a desired characteristic for industrial use as a long service life, a high efficiency and high brightness. For the reason, the LD pumped solid-state laser device has been actively developed. Particularly, the LD pumped Nd:YAG laser has been developed so that its output is 10W level on the market or kW level on development stage.

Figure 1:
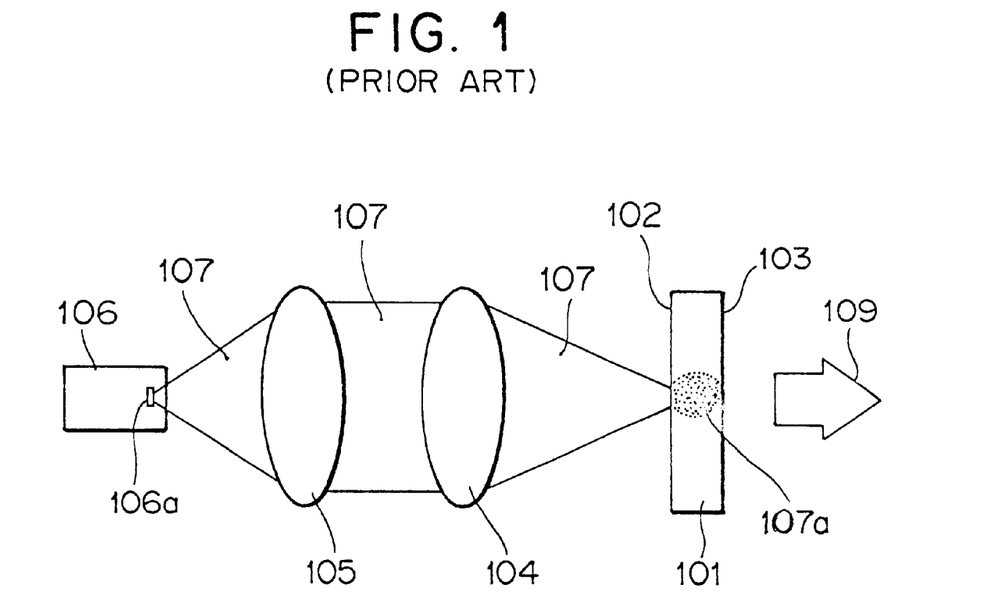
FIG. 1 is a schematic diagram showing a conventional microchip-type solid-state laser device.

By using a laser crystal having a high absorption peak in a pump wavelength range, an output of the solid-state laser device can be provided in a very small volume. Thus, attention has been paid to development on reduction of the size of a laser head size. As such a solid-state laser device, for example, so-called microchip-type solid-state laser device is currently available. FIG. 1 is a schematic diagram showing an existing microchip-type solid-state laser device. In the existing microchip-type solid-state laser device, one end face 102 of a laser crystal 101 in which a thickness thereof is about several hundreds μm, generally about one or two times absorption length which is a reciprocal of the absorption coefficient, is treated with high reflection coating, while the other end face 103 is treated with partial reflection coating.

If laser beam impinges upon the end face 102 on which the high reflection coating is applied from inside of the laser crystal 101, the laser beam is fully reflected. However, excitation beam impinging on the end face 102 from outside of the laser crystal 101 is not reflected but passes through. If the laser beam impinges upon the end face 103 on which the partial reflection coating is applied from inside of the laser crystal 101, part of the laser beam is reflected, and the other part thereof is not reflected but passes through.

A focusing lens 104 and a collimate lens 105 are disposed in parallel to the end face 102 on a side of the end face 102 of the laser crystal 101. A semiconductor laser 106 is disposed at a position sandwiching the focusing lens 104 with the collimate lens 105. Excitation laser beam 107 is emitted from an emission portion 106a of the semiconductor laser 106 to the collimate lens 105.

In a existing microchip-type solid-state laser device having such a structure, the excitation laser beam 107, which is emitted from the emission portion 106a of the semiconductor laser 106 and has a divergence angle, is converted to parallel beam by the collimate lens 105. After converted to parallel beam, the excitation laser beam 107 is refracted by the focusing lens 104 so that its focal point is made on the end face 102. The laser crystal 101 is excited by the beam impinging upon the end face 102 and the beam is reflected between the end face 102 and end face 103 so as to generate resonator internal circulating beam 107a. After that, laser oscillation beam 109 is emitted from the end face 103.

Table 1 shows absorption coefficients and absorption lengths of typical solid-state laser crystals (Nd:YVO$_4$ crystal, Nd:YAG crystal and Yb:YAG crystal) having an oscillation wavelength band of 1 μm.

TABLE 1

| Laser crystal | Pump wavelength (nm) | Absorption coefficient (cm$^{-1}$) | Doping density (atomic %) | Absorption length (mm) |
|---|---|---|---|---|
| Nd:YAG | 809 | 8 | 1 | 1.25 |
| Nd:YVO$_4$ | 809 | 25(σ) | 1.5 | 0.4 |
|  |  | 110(π) |  | 0.1 |
| Yb:YAG | 940 | 50 | 50 | 0.2 |

Nd:YVO$_4$ having an excessively large absorption coefficient of Nd series has been often used as a laser crystal for the microchip-type solid-state laser device. Further, Yb:YAG having a quasi-three-level energy structure can be also formed to a microchip. By that microchip-type structure, it is possible to integrate a laser resonator comprising a solid-state laser crystal and a reflector sandwiching it with the solid-state laser crystal. As a result, a small solid-state laser device having a high resistance to mechanical vibration and thermal variation can be achieved.

For example, a solid-state laser device having a structure shown in FIG. 1 and employing Nd:YVO$_4$ crystal as the laser crystal 101 has been described in "Optics Letters, vol.16, p.1955, 1991". The thickness of the Nd:YVO$_4$ crystal which is used as the laser crystal of the solid-state laser device described in the document is 500 μm. By exciting the Nd:NVO$_4$ with a semiconductor laser (wavelength: 809 nm) having 500 mW output, a laser output of 160 mW (wavelength: 1064 nm) can be obtained. At this time, in the excitation optical system, a single lens having a focal length of 4.5 mm, which functions as a collimate lens and a focusing lens at the same time, is used. The reflection factor of the partial reflector is 99% with respect to the laser oscillation wavelength.

However, in a conventional LD pumped solid-state laser device as described previously, as shown in FIG. 1, an optical element (lens, mirror, prism and such) having a limit in miniaturization of the excitation optical system for introducing the excitation laser beam 107 into the laser crystal 101 has been often used. Therefore, in the conventional microchip-type solid-state laser device, even if the laser crystal can be thinned, the entire laser head including an excitation optical system and a LD is not always of small size. In such an excitation optical system having a micro optical element, after each optical element is adjusted to an accurate position on the optical axis, it needs to be held strictly. Further, there is such a problem that a change of the semiconductor laser focusing position and a change of the laser output thereby is caused by thermal expansion of the case due to temperature change, mechanical vibration and such, because of two reasons that a propagation distance of the excitation beam is large and that the macro optical element is spatially separated from the laser crystal for not integral type.

Figure 2:
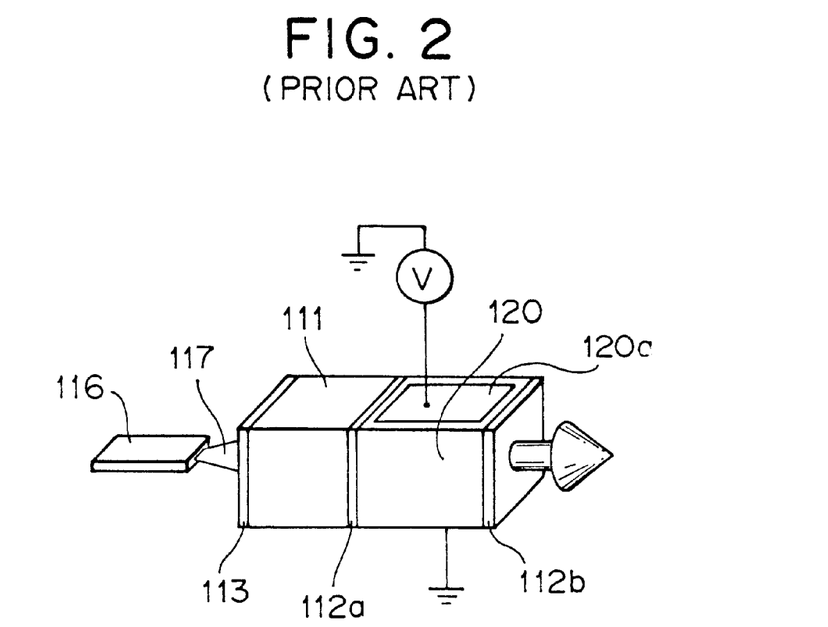
FIG. 2 is a schematic view showing a conventional solid-state laser device described in "Optics Letters, vol. 17, p.1201, 1992"

Therefore, a solid-state laser device not having the excitation optical system provided with a lens and such has been proposed in "Optics Letters, vol.17, p.1201, 1992". FIG. 2 is a schematic diagram showing a conventional solid-state laser device described in "Optics Letters, vol.17, p.1201, 1992". In the conventional solid-state laser device, a partial reflector 112a is disposed on an end face of the laser crystal 111 and a full reflector 113 is disposed on the other end face.

Further, a Q switch element 120 is connected to the partial reflector 112a and a partial reflector 112b is disposed on the other end face of the Q switch element 120. Further, an electrode 120a on which a source voltage is applied and an electrode to be grounded are provided for the Q switch element 120. Then, a semiconductor laser 116 is disposed on the end face in which the full reflector 113 of the laser crystal 111 is provided.

Because the solid-state laser device does not contain any excitation optical system like the collimate lens, miniaturization thereof can be achieved more easily than the above-mentioned conventional solid-state laser device. However, because the divergence angle of the excitation laser beam 117 is large, it is necessary to dispose the semiconductor laser 116 and the laser crystal 111 near each other. Therefore, it is difficult to connect plural semiconductor lasers for excitation so that there is an obstacle in enhancement of the output.

Figure 3:
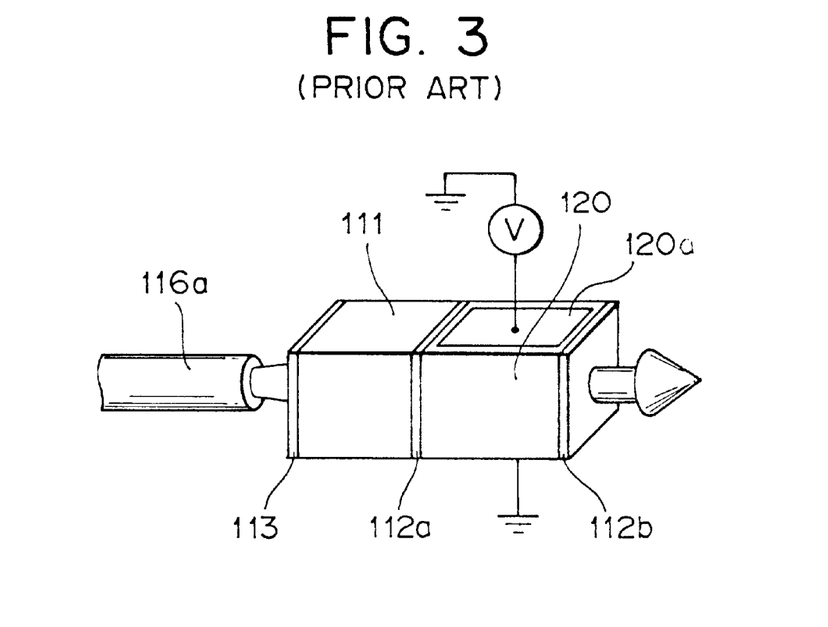
FIG. 3 is a schematic view showing a conventional solid-state laser device described in "Conference on Lasers and Electro-optics (CLEO), p.176, paper CWC65, 1995"

A solid-state laser device in which the excitation laser beam is transmitted via multi-mode fiber has been described in "Conference on Lasers and Electro-optics (CLEO), p.176, paper CWC6, 1995". FIG. 3 is a schematic diagram showing a conventional solid-state laser device described in "Conference on Lasers and Electro-optics (CLEO), p.176, paper CWC6, 1995". In this conventional solid-state laser device, multi-mode optical fiber 116a is disposed instead of the aforementioned semiconductor laser 116. Further, although not shown, an excitation laser beam impinges on the other end of the optical fiber 116a from a semiconductor laser.

In this case also, the Q switch element 120 is provided so that pulse operated microchip laser is achieved. However, a laser head including the semiconductor laser is not always of small size.

Figure 4:
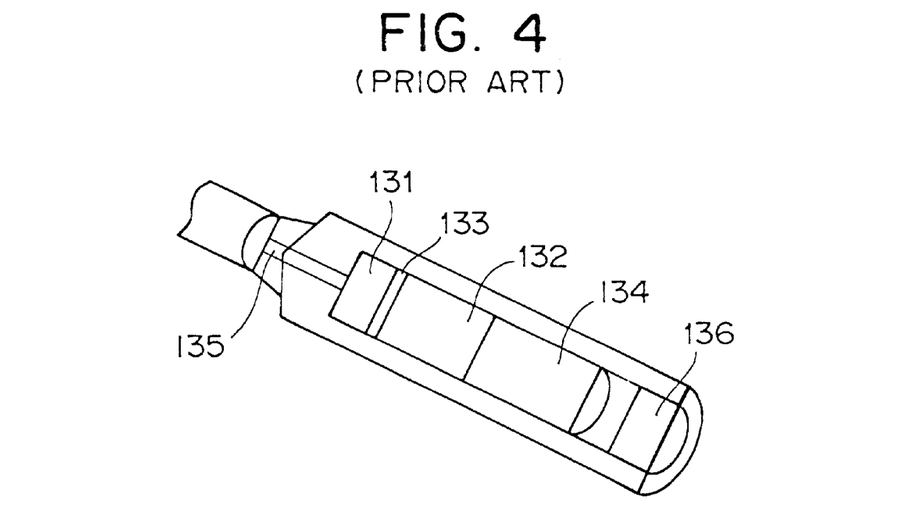
FIG. 4 is a schematic view showing a conventional solid-state laser device described in "Conference on Lasers and Electro-optics (CLEO), p.236, paper CWA6, 1996"

Further, a solid-state laser device for generating the fourth harmonics has been described in "Conference on Lasers and Electro-optics (CLEO), p.236, paper CWA6, 1996". FIG. 4 is a schematic diagram showing a conventional solid-state laser device described in "Conference on Lasers and Electro-optics (CLEO), p.236, paper CWA6, 1996". In this conventional solid-state laser device, a laser crystal 131 composed of Nd:YAG crystal is connected to an optical fiber 135 and a KTP crystal 132 is connected to the laser crystal 131 through a Cr:YAG crystal 133, which is the Q switch element. Further, a fourth harmonics generating element 134 is connected to the KTP crystal 132 and a window 136 is provided with a predetermined distance relative to the fourth harmonics generating element 134.

Figure 5:
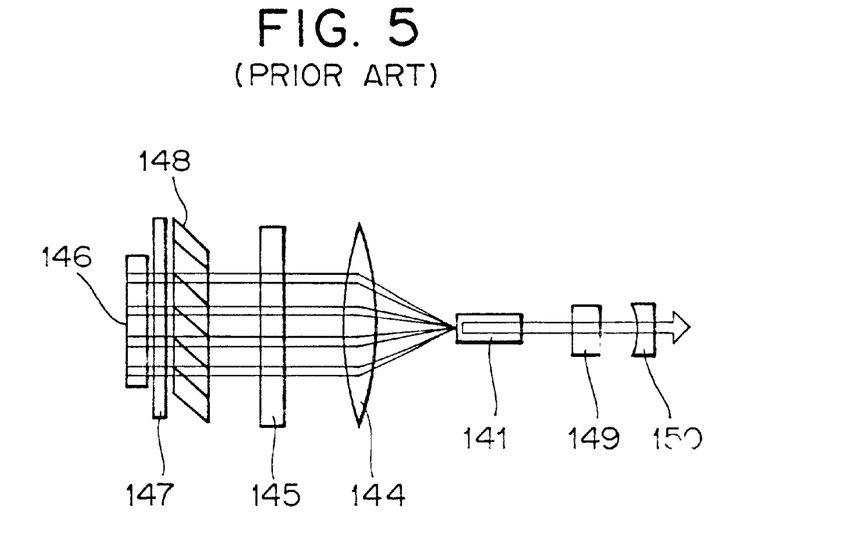
FIG. 5 is a schematic diagram showing a conventional solid-state laser device described in "Applied Optics vol.35, p.1430, 1996"

With a progress of development of micro optical devices (micro optics), there has been produced a prior art in which a lens array or a prism array is used as the excitation optical system ("Applied Optics vol.35, p.1430, 1996"). FIG. 5 is a schematic diagram showing a conventional solid-state laser device described in "Applied Optics vol.35, p.1430, 1996". In this conventional solid-state laser device, on one end face of a rod type laser crystal 141, in which reflectors are disposed on both end faces, a focusing lens 144, a cylindrical lens 145, a rotation prism array 148, a cylindrical lens array 147 and a laser bar 146 composed of a plurality of elements are arranged in order from the laser crystal 141 side. Further, a Q switch 149 and an output mirror 150 are disposed on the same line as the focusing lens 144 and such on the other end face side of the laser crystal 141.

In this conventional solid-state laser device, a rotation prism of the rotation prism array 148 is rotated at each element of the semiconductor laser bar 146. The focal point of the excitation laser beam is focused on the end face of the laser crystal 141 made of Nd:YAG crystal by the focusing lens 144. Then, the laser crystal 141 is excited.

Figure 6:
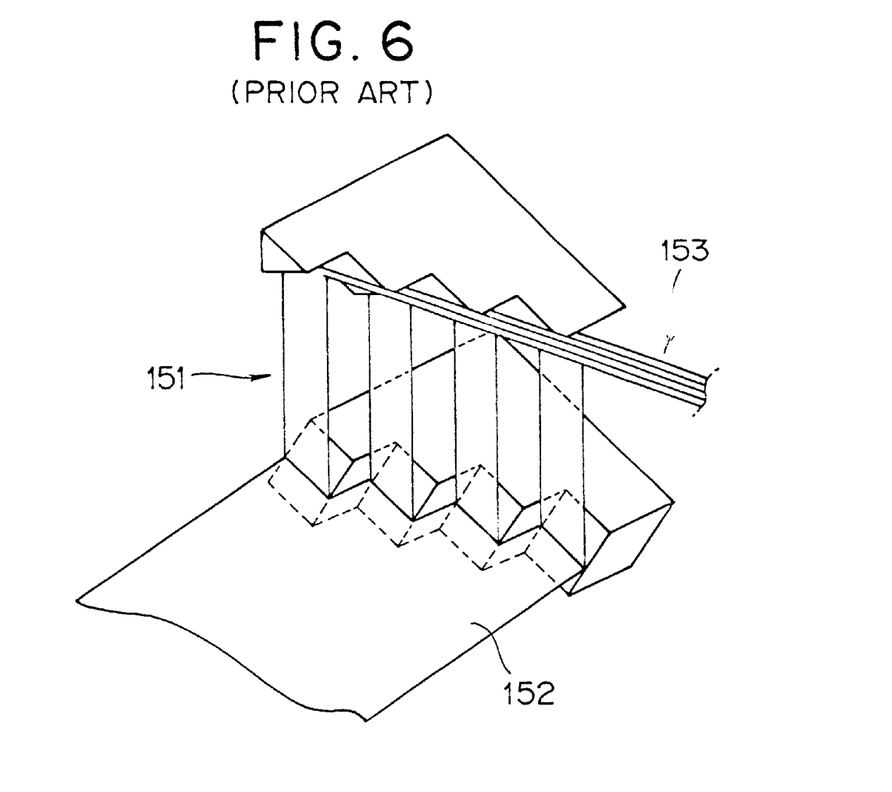
FIG. 6 is a schematic view showing a solid-state laser device described in "OSA TOPS vol.10 Advanced Solid-State Lasers, 1997, p.390"

Further, an example of the excitation optical system using a micro step mirror has been described in "OSA TOPS vol.10 Advanced Solid-State Lasers, 1997, p.390". FIG. 6 is a schematic diagram showing a solid-state laser device described in "OSA TOPS vol.10, Advanced Solid-State Lasers, 1997, p.390". This conventional solid-state laser device is provided with a micro step mirror 151 comprising a pair of mirrors each having a mirror surface inclined against the direction of advancement of laser. Semiconductor laser bar beam 152 irradiated to the micro step mirror 151 is reflected by one mirror and projected to the other mirror. Further, beam projected to the other mirror is reflected by the same mirror. As a result, excitation beam group 153 rotated by 90 degree from the semiconductor laser bar beam 152 is emitted from the micro step mirror 151.

However, although the optical element like the lens is not necessary in these conventional solid-state laser devices, there is such a problem that optical loss is large so that operating stability is not enough.

SUMMARY OF THE INVENTION

It is an object of the present invention to provide a small solid-state laser device in which a high stability and a high output can be assured, and a solid-state laser amplifier provided with the same.

According to one aspect of the present invention, a solid-state laser device may comprise a substrate and a laser crystal formed on the substrate. The laser crystal oscillates laser beam from a second end face when an excitation beam is projected to a first end face. The solid-state laser device may further comprise an excitation beam emission element emitting the excitation beam and a waveguide path on the substrate, the excitation beam being transmitted through the waveguide path. The waveguide path has a first end portion on which the excitation beam emitted by the excitation beam emission element impinges and a second end portion which opposes the first end face of the laser crystal, the excitation beam being emitted from the second end portion.

According to another aspect of the present invention, a solid-state laser device may comprise a substrate and a laser crystal formed on the substrate. The laser crystal oscillates laser beam from a second end face when an excitation beam is projected to a first end face. The solid-state laser crystal may further comprise an excitation beam emission element emitting the excitation beam, a plurality of waveguide paths formed on the substrate, the excitation beam being transmitted through each of the waveguide paths, and a synthesizer formed on the substrate. Each of the waveguide paths has a first end portion on which the excitation beam emitted by the excitation beam emission element impinges and a second end portion from which the excitation beam is emitted. The synthesizer connects each of the second end portion of the waveguide path to one another and opposes the first end face of the laser crystal.

According to the present invention, the excitation beam emitted by the excitation emitting element may be transmitted through the waveguide path and emitted to the first end face of the laser crystal. Then, laser beam is oscillated from the second end face by the laser crystal. Thus, loss during transmission is small and such optical devices as a lens and prism are not necessary. Therefore, the size of the excitation optical system can be extremely reduced and therefore the size of the laser head can be reduced.

Further, because the excitation optical system and laser crystal can be integrated on the same substrate, it is possible to provide a high reliability solid-state laser beam source having a small output variation with respect to temperature changes and mechanical vibration.

Further, because various kinds of optical control elements (optical modulation, wavelength filter, optical switch and such) can be provided on the waveguide path, it is possible to obtain a smaller, higher performance laser beam source by integrating a high-performance optical element.

The first end face may be coated with a film not reflecting the excitation beam and fully reflecting the laser beam excited by the excitation beam, and the second end face may be coated with a film partially reflecting the laser beam.

The solid-state laser device of the present invention may further comprise a wavelength conversion element converting the wavelength of the laser beam oscillated from the second end face. The first end face may be coated with a film not reflecting the excitation beam and fully reflecting the laser beam excited by the excitation beam and the second end face may be coated with a film not reflecting at least a part of the laser beam. As a result, a higher output can be obtained.

Further, the thickness of the laser crystal is preferably one to two times a reciprocal of an absorption coefficient of the excitation beam.

Furthermore, the solid-state laser device of the present invention may comprise a focusing lens focusing the laser beam and a transmission path of single mode through which the laser beam focused by the focusing lens is transmitted. The single mode transmission path may comprise, for example, a single-mode fiber or a single-mode quartz waveguide path.

According to another aspect of the present invention, a solid-state laser amplifier may comprise a substrate and a laser crystal formed on the substrate. The laser crystal emits laser beam from a second end face when an excitation beam is projected to a first end face. The solid-state laser amplifier may further comprises a non-reflecting film coating the first and second end faces, an excitation beam emission element emitting the excitation beam and an waveguide path for excitation beam formed on the substrate, the excitation beam being transmitted through the waveguide path for excitation beam. The non-reflecting film does not reflect a signal beam within a gain bandwidth of the laser crystal. The waveguide path for excitation beam has a first end portion on which the excitation beam emitted by the excitation beam emission element impinges and a second end portion which opposes the first end face of the laser crystal, the excitation beam being emitted from the second end portion. The solid-state laser amplifier may further comprise a waveguide path for signal beam entry formed on the substrate, the signal beam within the gain bandwidth being transmitted through the waveguide path for signal beam entry, and a waveguide path for signal beam emission on the substrate, the laser beam oscillated from the second end face being transmitted through the waveguide path for signal beam emission. The waveguide path for signal beam entry has an end portion, the signal beam being emitted toward the first end face of the laser crystal from the end portion. The waveguide path for signal beam emission has an end portion on which the laser beam impinges.

According to another aspect of the present invention a solid-state laser amplifier may comprise a substrate and a laser crystal formed on the substrate. The laser crystal emits laser beam from a second end face when excitation beam is projected to a first end face. The solid-state laser amplifier may further comprise a full-reflection film coating the first end face, a non-reflection film coating the second end face, an excitation beam emission element emitting the excitation beam and an waveguide path for excitation beam formed on the substrate, the excitation beam being transmitted through the waveguide path for excitation beam. The full-reflection film does not reflect the excitation beam and fully reflects a signal beam within a gain bandwidth of the laser crystal. The non-reflection film does not reflect the signal beam within the gain bandwidth. The waveguide path for excitation beam has a first end portion on which the excitation beam emitted by the excitation beam emission element impinges and a second end portion which opposes the first end face of the laser crystal, the excitation beam being emitted from the second end portion. The solid-state laser amplifier may further comprise a waveguide path for signal beam entry on the substrate, the signal beam within the gain bandwidth being transmitted through the waveguide path for signal beam entry, and a waveguide path for signal beam emission formed on the substrate, the laser beam oscillated from the second end face being transmitted through the waveguide path for signal beam emission. The waveguide path for signal beam entry has an end portion, the signal beam being emitted toward the second end face of the laser crystal. The waveguide path for signal beam emission has an end portion on which the laser beam impinges.

According to the present invention, the signal beam which is transmitted through the waveguide path for signal beam entry and emitted to the end face of the laser crystal is amplified in the laser crystal and emitted into the waveguide path signal beam emission. In this case also, loss is small and the size of the amplifier can be reduced easily because a lens and such is not necessary.

According to the present invention, because an active element having an amplifying function and a passive element having optical control function can be integrated on the same substrate, a small size, high performance laser amplifier can be obtained in application for optical transmission, optical information processing and such.

Further, batch film fabrication process technology in semiconductor industry and self-align technology in optoelectronics industry may be applied to the present invention. By employing these technologies, production cost can be reduced.

DESCRIPTION OF THE PREFERRED EMBODIMENTS

Figure 7A:
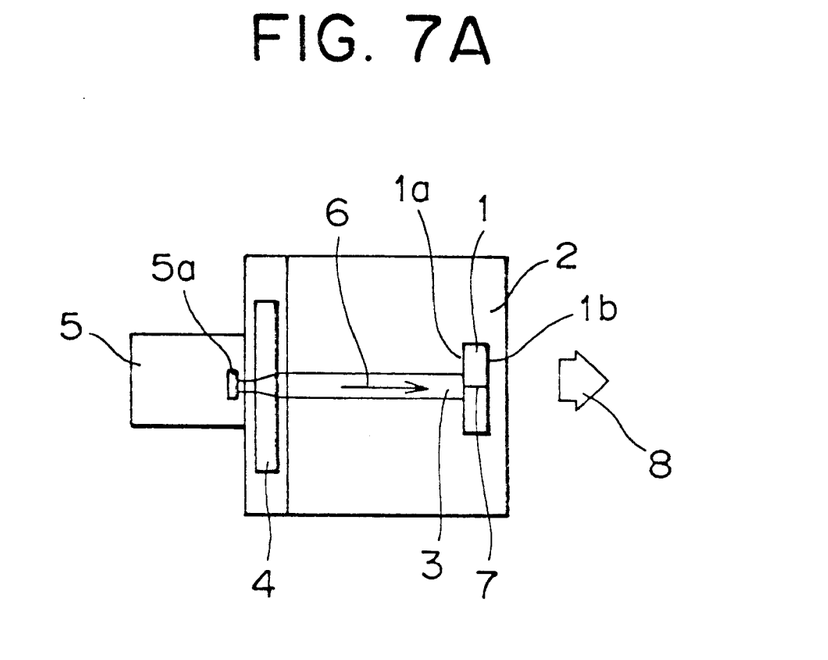
FIGS. 7A and 7B are schematic diagrams showing a solid-state laser device according to a first embodiment of the present invention.
Figure 7B:
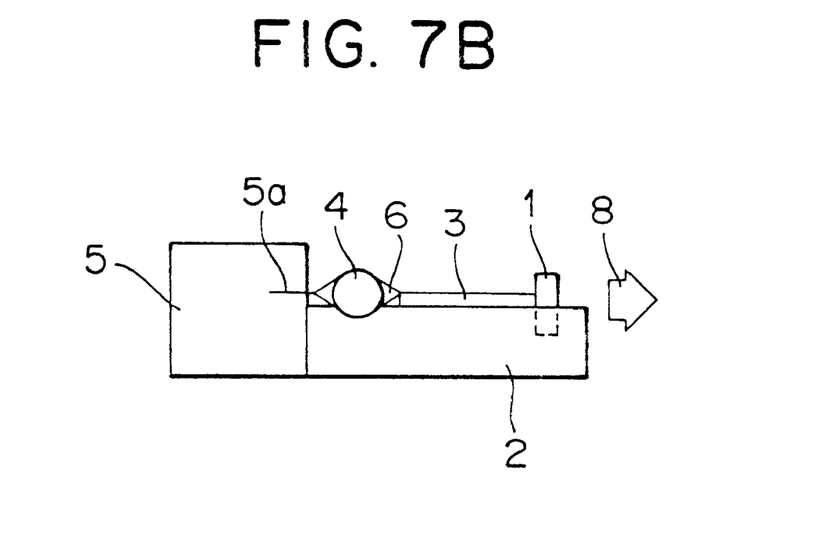

Hereinafter, a solid-state laser device according to embodiments of the present invention will be described in detail with reference to the accompanying drawings. FIG. 7A is a schematic view of a solid-state laser device according to a first embodiment of the present invention as viewed from above, and FIG. 7B is a schematic view of the same solid-state laser device as viewed from sideways.

According to the first embodiment of the present invention, a laser crystal 1 composed of, for example, Nd:YVO$_4$ having a thickness of about several hundreds $\mu$m is disposed on a substrate 2. The substrate 2 is made of, for example, silicone or quartz. The substrate 2 may be composed of any material as long as it is capable of forming a waveguide path having a low loss with respect to pump wavelength and laser oscillation wavelength in optical communication.

One end face 1a of the laser crystal 1 may be coated with high-reflection multiple-layer film (not shown). The high-reflection multiple-layer film allows an excitation beam irradiated from outside to excite the laser crystal 1 and reflects fully a laser beam excited by the excitation beam.

The other end face 1b of the laser crystal 1 may be coated with partial reflection multiple-layer film (not shown). The partial reflection multiple-layer film is a multiple-layer film for reflecting laser beam excited by the excitation beam partially. Laser oscillation is carried out by the laser crystal 1, the high-reflection multiple-layer film and the partial-reflection multiple-layer film. That is, a so-called microchip-type solid-state laser is constructed here.

Further, a multi-mode waveguide path 3 is formed on the substrate 2 such that an emission port thereof is in the vicinity of the full-reflection multiple-layer film coating the end face 1a and perpendicular to the end face 1a. The width of the multi-mode waveguide path 3 is, for example, 400 to 1000 $\mu$m and a thickness thereof is about 5 to 10 $\mu$m. Meanwhile, the width of the multi-mode waveguide path 3 may be adjusted by the width of a light emission width of a semiconductor laser described later. This multi-mode waveguide path 3 can be formed in an ordinary waveguide path fabrication method, for example, ion exchange, thermal diffusion, sputtering or a similar method. For example, in case where the substrate 2 is made of quartz and the multi-mode waveguide path 3 is of quartz waveguide path, refractive index n is 1.46 and specific refractive index difference Δ is 0.35%. Therefore, in this case, the numerical aperture (NA) of an incident side of the waveguide path is 0.12 because of NA=n×(2×Δ)$^{1/2}$ and an allowable beam receiving angle is 14 degree.

Further, a cylindrical lens 4 is disposed on the substrate 2. The direction of extension of the cylindrical lens 4 is perpendicular to the direction of extension of the multi-mode waveguide path 3. A distance between the cylindrical lens 4 and the multi-mode waveguide path 3 is, for example, 1.795 mm. The cylindrical lens 4 is a distributed refractive index lens, in which a focal length thereof is 0.5 mm and a diameter thereof is 0.73 mm. A non-spherical lens may be used as the cylindrical lens.

Further, a broad area type semiconductor laser 5 is disposed as an excitation light source sideways of the substrate 2 such that it is apart by 0.285 mm from the cylindrical lens 4. The light emission portion 5a of the semiconductor laser 5 is on the same straight line as the direction of the extension of the multi-mode waveguide path 3. Therefore, a distance between the semiconductor laser 5 and a principal point of the cylindrical lens 4 is 0.65 mm and a distance between the semiconductor laser 5 and the multi-mode waveguide path 3 is 2.81 mm. For example, an output of the semiconductor laser 5 is 4W, the width of the light emission area of a direction is 500 $\mu$m, the divergence angle in this direction is 10 degree, the width of the light emission area perpendicular to that direction is 1 $\mu$m and the divergence angle in that direction is 40 degree.

Hereinafter, a small divergence angle (light emission area width: 500 $\mu$m) of the semiconductor laser 5 is referred to as slow axis and a large divergence angle (light emission: area width 1 $\mu$m) is referred to as fast axis. Because in case of the semiconductor laser 5 having a 4W output for use in this embodiment, the laser beam divergence angle of the slow axis is about 10 degree, the wave can be guided if considering from standpoint of the incident angle. On the other hand, although the divergence angle in the fast axis is 40 degree, because the cylindrical lens 4 is disposed between the semiconductor laser 5 and the multi-mode waveguide path 3, the beam divergence angle is suppressed so that a high efficiency waveguide is enabled. That is, the laser beam is enlarged about 3.3 times, so that its divergence angle is reduced to 1/(3.3) times or about 12 degree within the allowable angle. Then, the laser beam enters into the multi-mode waveguide path 3. Because the distance between the semiconductor laser 5 and the multi-mode waveguide path 3 is 2.81 mm, although the width in the slow axis direction is wider by about 400 $\mu$m than the light emission area width, by setting the width of the multi-mode waveguide path 3 to 900 $\mu$m by summing up the light emission area width and its expansion rate, a high efficiency waveguide can be achieved while the allowable angle is satisfied.

In the solid-state laser device of the first embodiment having such a structure, excitation laser beam 6 emitted from the light emission portion 5a of the semiconductor laser 5 impinges upon the cylindrical lens 4. Then, the divergence angle in the fast axis direction of the excitation laser beam 6 is made to about 12 degree by the cylindrical lens 4 as described above, and then that excitation laser is projected to the incident port of the multi-mode waveguide path 3. Next, the excitation laser beam 6 is transmitted through the multi-mode waveguide path 3 and after that, emitted from an emission port at a divergence angle (14 degree), which is determined depending on the numerical aperture (NA) of the multi-mode waveguide path 3, and transmitted in free space. Then, the excitation laser beam 6 is projected to the full-reflection multi-layer film applied on the end face 1a of the laser crystal 1 located in the vicinity of the emission port.

If the thickness of the laser crystal 1 is, for example, 400 µm, the diffusion thereof in transmission is suppressed to about 400×2×tan (14/2) degree=100 µm. The π polarization factor and the σ polarization factor of the excitation laser beam 6 are absorbed by 98% and 63% respectively through a single path. Therefore, an elliptic excitation area (laser gain area), in which a long axis thereof is 1000 µm (width of excitation beam waveguide path +100 µm) and a short axis thereof is 110 µm (thickness of excitation beam waveguide path +100 µm), or rectangular excitation area 7 of an equivalent size, is formed to the thickness direction of the laser crystal 1. Then, excited laser beam is oscillated between the end face 1a and the end face 1b, and emitted from the end face 1b as a laser oscillation beam 8. At this time, the excitation density may reach 3.6 kW/cm$^2$ so that a sufficiently high efficiency operation is achieved in four-level Nd:YVO$_4$.

By setting an excitation diameter or curvature of crystal end face appropriately, lowest-order transverse mode oscillation of the laser oscillation beam is enabled. In Nd:YVO$_4$ microchip-type solid-state laser having a thickness of 400 µm, by setting a reflection factor of an output mirror to 90%, the output of the laser oscillation beam was 1.2 W (wavelength: 1064 nm) when the excitation output was 4W. Therefore, a high excitation density was obtained so that optical efficiency of 30% was achieved.

Although in the first embodiment, Nd:YVO$_4$ is used as the laser crystal 1, the present invention is not restricted to such an embodiment. It is permissible to use quasi-three-level laser medium such as Yb:YAG or Yb:LuAG, in which Yb$^{3+}$ is active ion, and Nd:YAG, Tm:YVO$_4$ or a similar crystal. Further, others may be used as long as a high absorption efficiency is possessed and the absorption length (reciprocal of absorption coefficient) is equal to or less than about 1 mm. This reason is that the thickness of the laser crystal can be thinned up to several hundreds µm.

Further, the excitation light source is not restricted to the semiconductor laser but other laser such as titan sapphire laser may be used. It is also permissible to use an array type semiconductor laser bar (output: 20 W, light emission area width: 1 cm×1 µm, stripe width: 50 to 200 µm, stripe number: 25 to 50).

Figure 8:
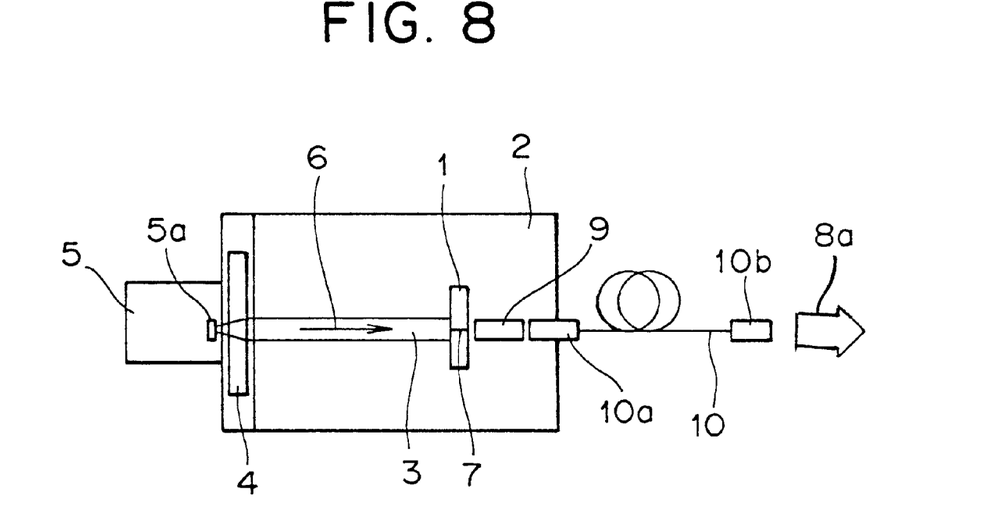
FIG. 8 is a schematic diagram showing an example in which an optical fiber and an optical fiber lens are incorporated in the first embodiment of the present invention.

Further, it is possible to dispose a single-mode optical fiber (SMF) for transmitting laser oscillation beam on the laser emission side of the laser crystal 1 and a lens for introducing a laser oscillation beam from the end face 1b to the optical fiber. FIG. 8 is a schematic diagram showing an example in which an optical fiber and an optical fiber lens are incorporated in the first embodiment of the present invention. In the solid-state laser device shown in FIG. 8, the same reference numerals are attached to the same elements as the solid-state laser device shown in FIG. 7A and a description thereof is omitted.

A focusing lens 9 is disposed in the vicinity of the partial reflection multi-layer film coating the end face 1b of the laser crystal 1 on the substrate 2. As the focusing lens 9, for example, a graded-index type lens (so-called GRIN lens), a non-spherical lens or such may be used. Further, a single-mode optical fiber 10 is provided such that a ferrule 10a is disposed at an one end thereof so as to sandwich the focusing lens 9 with the laser crystal 1. A ferrule 10b is provided at the other end of the single-mode optical fiber 10.

According to the solid-state laser device having such a structure, laser oscillation beam emitted from the end face 1b is condensed by the focusing lens 9 and irradiated onto the ferrule 10a. Then, the laser oscillation beam projected into the ferrule 10a is transmitted through the single-mode optical fiber 10. Then, the laser oscillation beam 8a is emitted from the ferrule 10b.

Instead of the single-mode optical fiber 10, a single-mode quartz waveguide path may be disposed. If the single-mode quartz waveguide path is disposed, further, an additional optical control element may be attached. For example, by attaching an optical modulation waveguide path or a similar path having acoustic optical effect or electric optical effect, it is possible to achieve a high function solid-state laser device capable of modulating an amplitude or a frequency, which is not a mere continuous oscillation solid-state laser device.

Figure 9:
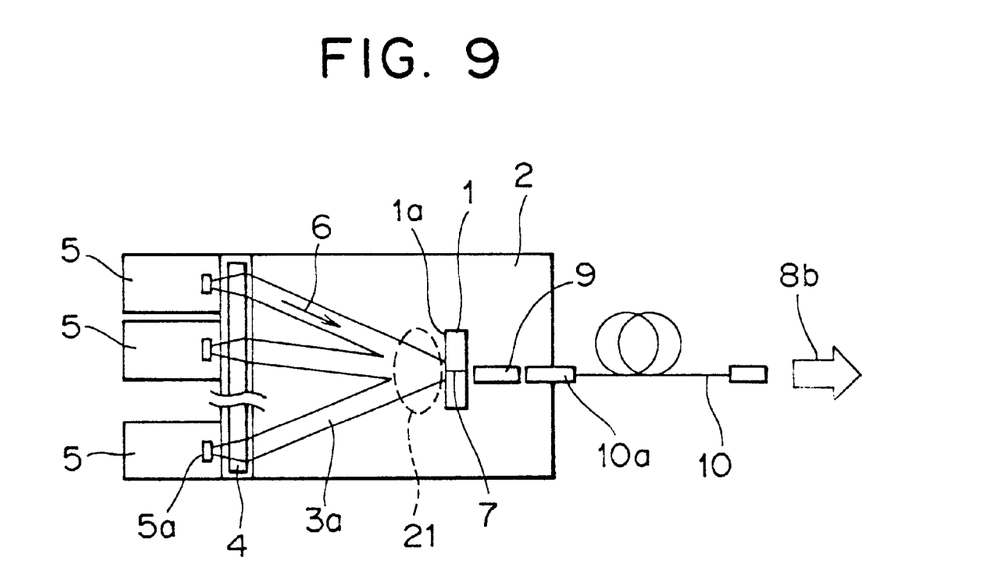
FIG. 9 is a schematic diagram showing a solid-state laser device according to a second embodiment.

Next, a second embodiment of the present invention will be described. The second embodiment contains a plurality of semiconductor lasers and the same number of branched waveguide paths as that of the semiconductor lasers are formed on a substrate. FIG. 9 is a schematic diagram showing a solid-state laser device according to the second embodiment of the present invention. In the second embodiment shown in FIG. 9, the same reference numerals are attached to the same elements as the first embodiment shown in FIG. 8 and a detailed description thereof is omitted.

According to the second embodiment, a plurality of the semiconductor lasers 5 are disposed as excitation light sources sideways of the substrate 2. A multi-mode coupler 21 is provided near the end face 1a of a laser crystal 1 and the same number of waveguide paths 3a as that of the semiconductor lasers 5 are branched from the multi-mode coupler 21. The other ends of the waveguide paths 3a oppose the light emission portion 5a of each semiconductor laser 5 sandwiching the cylindrical lens 4 with it.

According to the solid-state laser device of the second embodiment having such a structure, the excitation laser beam 6 emitted from each semiconductor laser 5 is transmitted through each waveguide path 3a and after that, synthesized by the multi-mode synthesizer 21. Then, the synthesized excitation laser beam is irradiated to the laser crystal 1 in the same manner as the first embodiment. Then, the laser oscillation beam 8b is emitted like the first embodiment.

Figure 10:
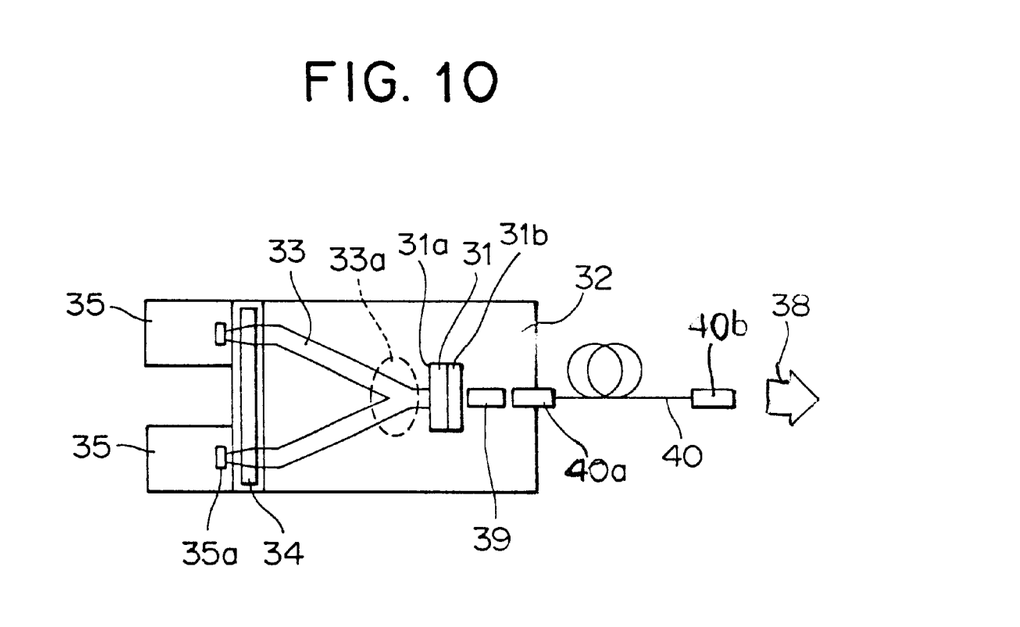
FIG. 10 is a schematic diagram showing a solid-state laser device according to a third embodiment of the present invention.

Next, a third embodiment of the present invention will be described. According to the third embodiment, a non-linear optical element made of bulk crystal is disposed on the light emission end face side of a laser crystal. FIG. 10 is a schematic diagram showing a solid-state laser device according to the third embodiment of the present invention.

According to the third embodiment, a laser crystal 31 composed of, for example, Nd:YVO$_4$ having a thickness of about several hundreds µm may be disposed on a substrate 32. An end face 31a of a laser crystal 31 is coated with full-reflection multi-layer film (not shown). Further, a non-linear optical element 31b made of bulk crystal is disposed on the substrate 32 such that it is bonded to the other end face of the laser crystal 31 or placed in the vicinity thereof.

As the non-linear optical element 31b, for example, a second harmonics generation (SHG) element for converting laser beam excited in the laser crystal 31 to the second harmonics, an optical parametric oscillator (OPO) for achieving optical parametric effect to generate a signal beam and idler beam may be used. As the material, for example, BaB$_2$O$_4$ (barium borate), LiB$_3$O$_5$ (3-lithium borate) and such can be picked up.

A resonator is composed of an end face 31a of the laser crystal 31, an emission side end face of the non-linear optical element 31b and such. In this manner, the so-called microchip-type solid-state laser is constructed.

A multi-mode synthesizer 33a is provided in the vicinity of the full-reflection multi-layer film coating the end face 31a on the substrate 32. Two branched multi-mode waveguide paths 33 are provided therefrom.

A cylindrical lens 34 is disposed on the substrate 32. The direction of the extension of the cylindrical lens 34 is perpendicular to the direction of the extension of the multi-mode waveguide path 33. A predetermined gap is provided between the cylindrical lens 34 and an emission port of the multi-mode waveguide path 33.

Two semiconductor lasers 35 are disposed as an excitation light source sideways of the substrate 32 with a predetermined gap relative to the cylindrical lens 34. A light emission portion 35a of the semiconductor laser 35 opposes each incident port of the multi-mode waveguide path 33 through the cylindrical lens 34.

Further, a focusing lens 39 is disposed on the substrate 32 in the vicinity of the non-linear optical element 31b. A single-mode optical fiber 40 is disposed such that a ferrule 40a thereof is provided to sandwich the focusing lens 39 with the laser crystal 31. A ferrule 40b is provided on the other end of the single-mode optical fiber 40. Then, laser oscillation beam 38 is oscillated from the ferrule 40b.

According to the solid-state laser device of the third embodiment having such a structure, oscillation wavelength can be converted. Further, internal resonator type wavelength conversion is employed for continuous oscillation operation so as to achieve a high efficiency operation.

In case where $BaB_2O_4$ crystal having a length of about 3 mm is disposed in the vicinity of the laser crystal composed of the above mentioned $Nd:YVO_4$ and the second harmonics are generated, 600 mW could be obtained stably as a green output (wavelength: 532 nm) under an excitation power of 4 W.

Figure 11:
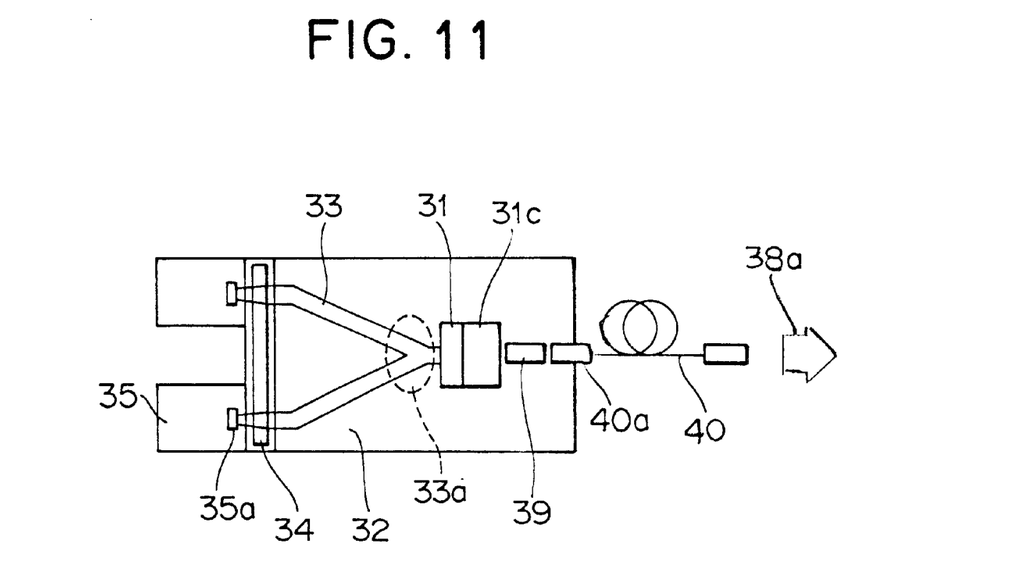
FIG. 11 is a schematic diagram showing a solid-state laser device according to a fourth embodiment of the present invention in which a pseudo phase matching type device is used as a nonlinear element.

As the non-linear optical element, a pseudo phase matching type device having a periodic polarization inverting structure as well as an ordinary bulk crystal may be used. FIG. 11 is a schematic diagram showing a solid-state laser device according to a fourth embodiment of the present invention in which the pseudo phase matching type device is used as the non-linear element. In the fourth embodiment shown in FIG. 11, the same reference numerals are attached to the same components as the third embodiment shown in FIG. 10 and a detailed description thereof is omitted.

According to the fourth embodiment, a pseudo phase matching device 31c is boned to an emission side end face of the laser crystal 31 or disposed in the vicinity thereof on the substrate 32 as the non-linear element. As the pseudo phase matching type device 31c, for example, a so-called periodic-poled $LiNbO_3$ may be used. Then, the laser oscillation beam 38a emits from the ferrule 40b.

In this case also, as described above, oscillation wavelength can be converted and the internal resonator type wavelength conversion is employed for continuous oscillation operation so as to achieve a high efficiency operation.

Figure 12:
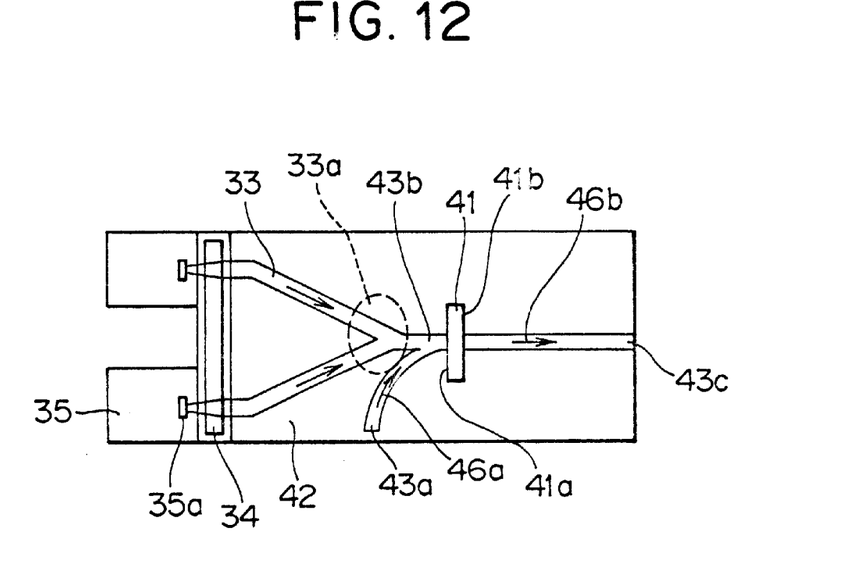
FIG. 12 is a schematic diagram showing a solid-state laser amplifier according to a fifth embodiment of the present invention.

Next, an optically-pumped type solid-state laser amplifier according to the embodiment of the present invention having the above-mentioned solid-state laser device will be described. In the solid-state laser amplifier according to the fifth embodiment, waveguide paths are provided between the multi-mode synthesizer and laser crystal. Then, like the ordinary optical fiber amplifier, a signal beam entry waveguide path, in which a signal beam to be amplified is transmitted, is connected to this waveguide path. FIG. 12 is a schematic diagram showing a solid-state laser amplifier according to the fifth embodiment of the present invention.

Meanwhile, in the fifth embodiment shown in FIG. 12, the same reference numerals are attached to the same components as the fourth embodiment shown in FIG. 11 and a detailed description thereof is omitted.

In the fifth embodiment, for example, Er:glass may be used as a laser crystal 41. A non-linear element is not disposed, and both end faces 41a and 41b of the laser crystal 41 may be coated with non-reflection film. The non-reflection film is a film not reflecting either the pump wavelength or signal beam. A signal beam entry waveguide path 43a is formed on a substrate 42. An end portion of the signal beam entry waveguide path 43a is connected to an emission port of the multi-mode waveguide path 33 and the other end portion is connected to the waveguide path 43b in the vicinity of the laser crystal 41 through a wavelength multiplex coupler. Further, a signal emission waveguide path 43c, in which an incident port thereof is located near non-reflection film applied on the end face 41b and which is perpendicular to the end face 41b, is formed at a position in which the laser oscillation beam can be fetched in easily on the substrate 2. As a host (not shown), garnet base material such as YAG as well as glass medium (silica base, phosphor base) may be used.

According to the solid-state laser amplifier according to the fifth embodiment having such a structure, the signal beam 46a, which is transmitted through the signal beam entry waveguide path 43a and impinges upon the laser crystal 41 within gain bandwidth of the laser crystal 41, is amplified in the laser crystal 41. Then, the amplified signal beam 46b is transmitted through the signal beam emission waveguide path 43c and emitted. As a result, optical amplification for a band of 1.55 μm, which is a wavelength for optical transmission, is achieved.

As the semiconductor laser 35 for emitting the excitation beam, a semiconductor laser having a 980 nm band or 1.48 μm band or such can be used. Further, by adding $Yb^{3+}$ to such material, the pump wavelength range can be expanded to 0.9–1.1 μm so that a so-called multi-mode type solid-state semiconductor laser having a high output can be obtained as an excitation light source.

Meanwhile, the signal beam entry waveguide path may be connected directly to the laser crystal 41.

Figure 13:
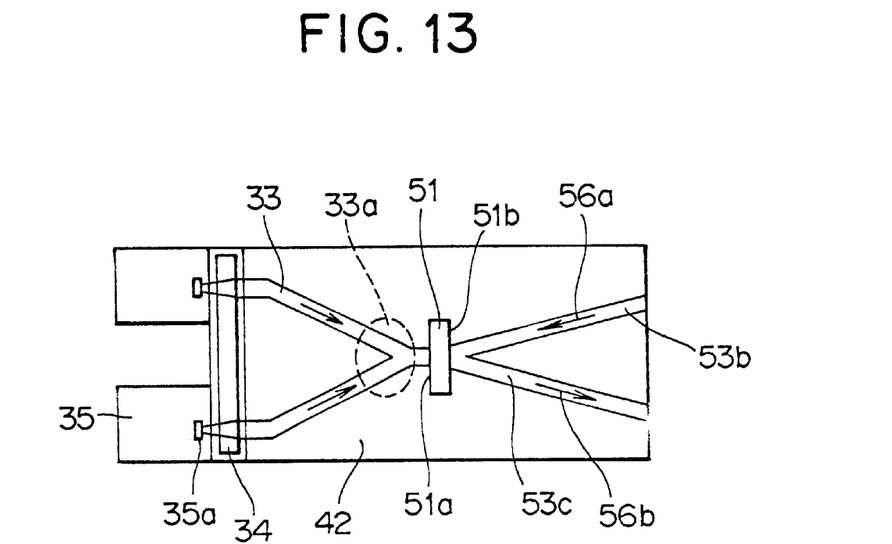
FIG. 13 is a schematic diagram showing a solid-state laser amplifier according to a sixth embodiment of the present invention.

Next, a solid-state laser amplifier according to a sixth embodiment of the present invention will be described. In the sixth embodiment, a signal beam to be amplified impinges upon an emission side end face of the laser crystal. FIG. 13 is a schematic diagram showing a solid-state laser amplifier according to a sixth embodiment of the present invention. In the sixth embodiment shown in FIG. 13, the same reference numerals are attached to the same elements as the fifth embodiment shown in FIG. 12 and a detailed description thereof is omitted.

An end face 51a upon which the excitation beam of the laser crystal 51 impinges is coated with a film not reflecting the pump wavelength and fully reflecting the signal beam wavelength. An end face 51b, from which the signal beam is emitted, is coated with a film not reflecting each wavelength. Signal beam entry waveguide paths 53b are formed on a substrate 42 on the same side as the signal beam emission waveguide path 53c to the laser crystal 51.

In the solid-state laser amplifier according to a sixth embodiment having such a structure, an incident signal beam 56a within a gain bandwidth of the laser crystal 51 passes a high gain portion formed by the semiconductor laser for emitting excitation laser beam twice, and then an emission signal beam 56b is emitted. Therefore, a high effective gain can be obtained.

In this case also, a waveguide path element having a function for wavelength filtering or switching treatment for a signal beam may be integrated in this solid-state laser amplifier.

What is claimed is:

1. A solid-state laser device comprising:
    a substrate;
    a laser crystal formed on said substrate, said laser crystal oscillating a laser beam from a second end face thereof when an excitation beam is projected to a first end face thereof,
    a broad area type excitation beam emission element emitting said excitation beam, said excitation beam emission element having a small divergence-angle axis and a large divergence-angle axis, said excitation beam emission element having a first predetermined width as a dimension corresponding to said small divergence-angle axis; and
    a multimode waveguide path formed on said substrate, said excitation beam being transmitted through said multimode waveguide path, said multimode waveguide path having a first end portion on which said excitation beam emitted by said excitation beam emission element impinges and a second end portion which opposes said first end face of said laser crystal, said excitation beam being emitted from said second end portion, wherein a width of said multimode waveguide path at said first end portion corresponds to said first predetermined width of said excitation beam emission element.

2. A solid-state laser device according to claim 1, wherein said first end face is coated with a film not reflecting said excitation beam and fully reflecting said laser beam excited by said excitation beam, and said second end face is coated with a film partially reflecting said laser beam.

3. A solid-state laser device according to claim 1, which further comprising a wavelength conversion element converting the wavelength of said laser beam oscillated from said second end face of said laser crystal, and
    wherein said first end face is coated with a film not reflecting said excitation beam and fully reflecting laser beam excited by said excitation beam, and said second end face is coated with a film not reflecting at least a part of said laser beam.

4. A solid-state laser device according to claim 1, wherein the thickness of said laser crystal is one to two times a reciprocal of an absorption coefficient of said excitation beam.

5. A solid-state laser device according to claim 1, which further comprising:
    a focusing lens focusing said laser beam; and
    a transmission path of single mode through which said laser beam condensed by said focusing lens is transmitted.

6. A solid-state laser device according to claim 5, wherein said transmission path comprises a single-mode fiber.

7. A solid-state laser device according to claim 5, wherein said transmission path comprises a single-mode quartz waveguide path.

8. The solid-state laser device of claim 1, wherein the substrate is comprised of a material selected from the group consisting of silicon and quartz.

9. The solid-state laser device of claim 1, further comprising a cylindrical lens disposed on the substrate between the excitation beam emission element and the waveguide path, said cylindrical lens having a direction of extension perpendicular to a direction of extension of the waveguide path.

10. The solid state laser device of claim 1, wherein said laser crystal and said excitation beam emission element are integrally formed on said substrate.

11. A solid-state laser device according to claim 1, wherein the thickness of the multimode waveguide path is between 5 and 10 $\mu$m.

12. A solid-state laser device comprising:
    a substrate;
    a plurality of laser crystals formed on said substrate, each said laser crystal oscillating a laser beam from a second face thereof when an excitation beam is projected to a first end face thereof,
    a plurality of broad area type excitation beam emission elements corresponding to said plurality of laser crystals, each said beam emission element emitting an excitation beam, each said excitation beam emission element having a small divergence-angle axis and a large divergence-angle axis, each said excitation beam emission element having a respective predetermined width as a dimension corresponding to said small divergence-angle axis;
    a plurality of waveguide paths formed on said substrate corresponding to said plurality of broad area type excitation beam emission elements, the excitation beam of said corresponding broad area type excitation beam emission element being transmitted through said corresponding waveguide path, each said waveguide path having a first end portion on which said excitation beam impinges and a second end portion from which said excitation beam is emitted, wherein a width of each said corresponding waveguide at said first end portion corresponds to said respective predetermined width of said excitation beam emission element; and
    a coupler formed on said substrate, said coupler connecting each of said second end portion of each said waveguide path to one another.

13. A solid-state laser device according to claim 12, wherein said first end face is coated with a film not reflecting said excitation beam and fully reflecting said laser beam excited by said excitation beam, and said second end face is coated with a film partially reflecting said laser beam.

14. A solid-state laser device according to claim 12, wherein the thickness of said laser crystal is one to two times a reciprocal of an absorption coefficient of said excitation beam.

15. A solid-state laser device according to claim 12 further comprising:
    a focusing lens focusing said laser beam; and
    a transmission path of single mode through which said laser beam condensed by said focusing lens is transmitted.

16. A solid-state laser device according to claim 15, wherein said transmission path comprises a single-mode fiber.

17. A solid-state laser device according to claim 15, wherein said transmission path comprises a single-mode quartz waveguide path.

18. The solid-state laser device of claim 12, wherein the substrate is comprised of a material selected from the group consisting of silicon and quartz.

19. The solid-state laser device of claim 12, further comprising a cylindrical lens disposed on the substrate between the excitation beam emission element and the plurality of waveguide paths, said cylindrical lens having a direction of extension perpendicular to a direction of extension of the plurality of waveguide paths.

20. The solid state laser device of claim 12, wherein said laser crystal and said excitation beam emission element are integrally formed on said substrate.

21. A solid-state laser device according to claim 12, wherein the thickness of the plurality of waveguide paths is between 5 and 10 µm.

22. A solid-state laser amplifier comprising:

a substrate;

a laser crystal formed on said substrate, said laser crystal emitting a laser beam from a second end face thereof when an excitation beam is projected to a first end face thereof;

a non-reflecting film coating said first and second end faces, said non-reflecting film not reflecting a signal beam within a gain bandwidth of said laser crystal;

a broad area type excitation beam emission element emitting said excitation beam, said excitation beam emission element having a small divergence-angle axis and a large divergence-angle axis, said excitation beam emission element having a first predetermined width as a dimension corresponding to said small divergence-angle axis; and a first waveguide path for said excitation beam formed on said substrate, said excitation beam being transmitted through said first waveguide path for excitation beam, said first waveguide path for excitation beam having a first end portion on which said excitation beam emitted by said excitation beam emission element impinges and a second end portion which opposes said first end face of said laser crystal, said excitation beam being emitted from said second end portion, wherein a width of said first waveguide path at said first end portion corresponds to said first predetermined width of said excitation beam emission element;

a second waveguide path for signal beam entry formed on said substrate, a signal beam within said gain bandwidth being transmitted through said second waveguide path for signal beam entry, and said second waveguide path for signal beam entry having an end portion, said signal beam being emitted toward said first end face of said laser crystal from said end portion; and a third waveguide path for signal beam emission formed on said substrate, said laser beam oscillated from said second end face being transmitted through said third waveguide path for signal beam emission, and said third waveguide path for signal beam emission having an end portion on which said laser beam impinges.

23. The solid state laser device of claim 22, wherein said laser crystal and said excitation beam emission element are integrally formed on said substrate.

24. A solid-state laser device according to claim 22, wherein the thickness of the first, second, and third waveguide paths is between 5 and 10 µm.

25. A solid-state laser amplifier comprising:

a substrate;

a laser crystal formed on said substrate, said laser crystal emitting laser beam from a second end face thereof when an excitation beam is projected to a first end face thereof;

a full-reflection film coating said first end face, said full-reflection film not reflecting said excitation beam and frilly reflecting a signal beam within a gain bandwidth of said laser crystal;

a non-reflection film coating said second end face, said non-reflection film not reflecting said signal beam within said gain bandwidth;

a broad area type excitation beam emission element emitting said excitation beam, said excitation beam emission element having a small divergence-angle axis and a large divergence-angle axis, said excitation beam emission element having a first predetermined width as a dimension corresponding to said small divergence-angle axis;

a first waveguide path for said excitation beam formed on said substrate, said excitation beam being transmitted through said first waveguide path for excitation beam, said first waveguide path for excitation beam having a first end portion on which said excitation beam emitted by said excitation beam emission element impinges and a second end portion which opposes said first end face of said laser crystal, said excitation beam being emitted from said second end portion onto said first end face of said laser crystal, wherein a width of said first waveguide path at said first end portion corresponds to said first predetermined width of said excitation beam emission element;

a second waveguide path for signal beam entry formed on said substrate, a signal beam within said gain bandwidth being transmitted through said second waveguide path for signal beam entry, and said second waveguide path for signal beam entry having an end portion, said signal beam being emitted toward said second end face of said laser crystal from said end portion; and a third waveguide path for signal beam emission formed on said substrate, said laser beam oscillated from said second end face being transmitted through said third waveguide path for signal beam emission, and said third waveguide path for signal beam emission having an end portion on which said laser beam impinges.

26. The solid state laser device of claim 25, wherein said laser crystal and said excitation beam emission element are integrally formed on said substrate.

27. A solid-state laser device according to claim 25, wherein the thickness of the first, second, and third waveguide paths is between 5 and 10 µm.

* * * * *